US 9,501,331 B2

(12) United States Patent
Li et al.

(10) Patent No.: US 9,501,331 B2
(45) Date of Patent: Nov. 22, 2016

(54) SATISFIABILITY CHECKING

(75) Inventors: Guodong Li, San Jose, CA (US);
Indradeep Ghosh, Cupertino, CA (US);
Sreeranga P. Rajan, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 765 days.

(21) Appl. No.: 13/570,906

(22) Filed: Aug. 9, 2012

(65) Prior Publication Data
US 2014/0047217 A1 Feb. 13, 2014

(51) Int. Cl.
G06F 9/30 (2006.01)
G06F 9/50 (2006.01)
G06F 11/36 (2006.01)

(52) U.S. Cl.
CPC .......... *G06F 9/5083* (2013.01); *G06F 9/5027* (2013.01); *G06F 11/3604* (2013.01); *G06F 11/3608* (2013.01); *G06F 11/3636* (2013.01); *G06F 11/3684* (2013.01); *G06F 2209/5017* (2013.01)

(58) Field of Classification Search
None
See application file for complete search history.

(56) References Cited

U.S. PATENT DOCUMENTS

| | | | | |
|---|---|---|---|---|
| 5,596,682 A * | 1/1997 | Yamazaki | ............. | G06N 5/006 706/45 |
| 6,292,916 B1 * | 9/2001 | Abramovici | ....... | G01R 31/3185 714/736 |
| 6,324,496 B1 * | 11/2001 | Alur | .................... | G06F 11/3608 703/17 |
| 7,418,369 B2 * | 8/2008 | Moskewicz et al. | ............ | 703/2 |
| 7,447,873 B1 * | 11/2008 | Nordquist | ........................ | 712/22 |
| 7,584,342 B1 * | 9/2009 | Nordquist et al. | .............. | 712/22 |
| 7,594,095 B1 * | 9/2009 | Nordquist | ........................ | 712/22 |
| 7,711,525 B2 * | 5/2010 | Ganai | .................... | G06F 17/504 703/2 |
| 7,788,468 B1 * | 8/2010 | Nickolls et al. | ................. | 712/22 |
| 8,136,098 B2 * | 3/2012 | Kahlon | ............... | G06F 11/3608 717/131 |
| 8,266,600 B2 * | 9/2012 | Kahlon | ............... | G06F 11/3608 717/124 |

(Continued)

OTHER PUBLICATIONS

'Propositional Satisfiability Checking with Distributed Dynamic Learning' by Wolfgang Blochinger et al., Apr. 15, 2003.*

(Continued)

*Primary Examiner* — Steven Snyder
(74) *Attorney, Agent, or Firm* — Maschoff Brennan

(57) ABSTRACT

A satisfiability checking system may include a single instruction, multiple data (SIMD) machine configured to execute multiple threads in parallel. The multiple threads may be divided among multiple blocks. The SIMD machine may be further configured to perform satisfiability checking of a formula including multiple parts. The satisfiability checking may include assigning one or more of the parts to one or more threads of the multiple threads of a first block of the multiple blocks. The satisfiability checking may further include processing the assigned one or more parts in the first block such that first results are calculated based on a first proposition. The satisfiability checking may further include synchronizing the results among the one or more threads of the first block.

21 Claims, 4 Drawing Sheets

(56) References Cited

U.S. PATENT DOCUMENTS

| | | | | |
|---|---|---|---|---|
| 8,286,137 | B2* | 10/2012 | Kahlon | G06F 11/3608 716/136 |
| 8,370,845 | B1* | 2/2013 | Le Grand | 718/106 |
| 8,380,483 | B2* | 2/2013 | Kahlon | G06F 11/3608 703/22 |
| 8,464,025 | B2* | 6/2013 | Yamaguchi et al. | 712/22 |
| 8,543,985 | B2* | 9/2013 | Kahlon | G06F 9/52 717/126 |
| 8,688,619 | B1* | 4/2014 | Ezick | G06F 17/504 706/57 |
| 8,689,069 | B2* | 4/2014 | Krenz-Baath | G06F 11/263 714/739 |
| 8,892,483 | B1* | 11/2014 | Ezick | G06F 17/11 706/14 |
| 2002/0184475 | A1* | 12/2002 | Koch, III | G06F 9/3879 712/223 |
| 2003/0225552 | A1* | 12/2003 | Ganai | G06F 17/504 703/2 |
| 2004/0177235 | A1* | 9/2004 | Koch, III | G06F 9/3879 712/223 |
| 2006/0184689 | A1* | 8/2006 | Jalowiecki et al. | 709/238 |
| 2007/0005633 | A1* | 1/2007 | Ball | G06F 11/3692 |
| 2007/0118340 | A1* | 5/2007 | Geist | G06F 17/504 703/2 |
| 2010/0169868 | A1* | 7/2010 | Condit | G06F 8/437 717/136 |
| 2010/0306308 | A1* | 12/2010 | Andraus | 709/203 |
| 2012/0317454 | A1* | 12/2012 | Krenz-Baath | G06F 11/263 714/739 |

OTHER PUBLICATIONS

'GrADSAT: A Parallel SAT Solver for the Grid' UCSB Computer Science Technical Report No. 2003-05 by Wahid Chrabakh and Rich Wolski, 2003.*
'GRASP: A Search Algorithm for Propositional Satisfiability' by Joao P. Marques-Silva and Karem A. Sakallah, IEEE Transactions on Computers, vol. 48, No. 5, May 1999.*
'Chaff: Engineering an Efficient SAT Solver' by Matthew W. Moskewicz et al., Proceedings of the 38th Annual Design Automation Conference, 2001.*
'PSATO: a Distributed Propositional Prover and Its Application to Quasigroup Problems' by Hantao Zhang et al., copyright 1996, Academic Press Limited.*
'GPU4SAT: solving the SAT problem on GPU' by Herve Deleau et al., 2008.*
'Algorithms for Random 3-SAT' by Abraham D. Flaxman, SIAM Journal on Computing 2010, vol. 39, No. 7: pp. 2823-2864.*
'Parallel Multithreaded Satisfiability Solver: Design and Implementation' thesis by Yulik Feldman, Jan. 2005.*
'MiraXT—A Multithreaded SAT Solver' by Tobias Schubert et al., System description for the SAT competition 2007.*
'Multithreaded SAT Solving' by Matthew Lewis et al., copyright 2007 by IEEE.*
'GPU Acceleration of BCP Procedure for SAT Algorithms' by Hironori Fujii, The 2012 International Conference on Parallel and Distributed Processing Techniques and Applications (PDPTA'12), 2012.*
'Solving Propositional Satisfiability Problems' by Robert G. Jeroslow, Annals of Mathematics and Artificial Intelligence, pp. 167-187, 1990.*
'Perceptron Learning of SAT' by Alex Flint et al., submitted Oct. 4, 2012.*
'Boolean Satisfiability on a Graphics Processor' by Kanupriya Gulati, copyright 2010 ACM.*
'Why almost all satisfiable k-CNF formulas are easy' by Amin Coja-Oghlan et al., 2007 Conference on Analysis of Algorithms.*
'Parallel Multithreaded Satisfiability Solver: Design and Implementation' by Yulik Feldman et al., copyright 2005 by Elsevier B.V.*
'PaMiraXT: Parallel SAT Solving with Threads and Message Passing' by Tobias Schubert et al., Journal on Satisfiability, Boolean Modeling and Computation 6 (2009), pp. 203-222.*
'A machine program for theorem-proving' by Davis et al., Communications of the ACM, vol. 5 Issue 7, Jul. 1962, pp. 394-397.*
'Introduction to Satisfiability Solving with Practical Applications' by Niklas Een, SAT/SMT Summer School at MIT, Cambridge 2011.*
'Approaches to Parallel SAT Solving' by Youssef Hamadi, SAT-SMT Summer School at MIT, Jun. 15, 2011.*
'A Fast Parallel SAT-Solver—Efficient Workload Balancing' by Bohm and Speckenmeyer, 1994.*
'A Universal Parallel SAT Checking Kernel' by W. Blochinger et al., Proc. of the Intl. Conf. on Parallel and Distributed Processing Techniques and Applications (PDPTA 2003), 2003.*
'ManySAT: a Parallel SAT Solver' by Youssef Hamadi et al., Journal on Satisfiability, Boolean Modeling and Computation 6 (2009) 245-262.*
'PMSat: a parallel version of MiniSAT' by Luis Gil, Journal on Satisfiability, Boolean Modeling and Computation 6 (2008) 71-98.*
'Diversification and Intensification in Parallel SAT Solving' by Long Guo et al., 16th International Conference on Principles and Practice of Constraint Programming (CP'10), 2010, United Kingdom. pp. 252-265, 2010.*
'Parallel and Selective Symbolic Execution' by George Candea and Stefan Bucur, MIT Summer School on SAT/SMT Solvers (Jun. 2011).*
Spampinato et al., "Linear Optimization on Modern GPUs", Norwegian University of Science and Technology, 2009.
Wintersteiger et al. "A Concurrent Portfolio Approach to SMT Solving", 21st International Conference on Computer Aided Verification (CAV), 2009: 715-720.
Hamadi et al. "ManySAT: a Parallel SAT Solver", Journal on Satisfiability, Boolean Modeling and Computation (JSAT), 6(4): 245-262 (2009).
Parallel SAT, Pascal Vander-Swalmen, retreived Aug. 8, 2012, <http://www.parallel-sat.net/>.

\* cited by examiner

300 ⬎

| Proposition | Thread 1 | Thread 2 | Thread 3 | Thread 4 | |
|---|---|---|---|---|---|
| ∅ | 1̄∨2 | 3̄∨4 | 5̄∨6 | 6∨5̄∨2̄ | Process Synchronize |
| 302 | Decide | Decide | Decide | Decide | Propose |
| 1$^d$ | ⊥∨2 | 3̄∨4 | 5̄∨6 | 6∨5̄∨2̄ | Process Synchronize |
| | 2 | | | | |
| 304 | Propagate | Decide | Decide | Decide | Propose |
| 1$^d$ 2 | T | 3̄∨4 | 5̄∨6 | 6∨5̄∨⊥ | Process Synchronize |
| 306 | SAT | Decide | Decide | Decide | Propose |
| 1$^d$ 2 3$^d$ | T | ⊥∨4 | 5̄∨6 | 6∨5̄∨⊥ | Process Synchronize |
| | | 4 | | | |
| 308 | SAT | Propagate | Decide | Decide | Propose |
| 1$^d$ 2 3$^d$ 4 | T | T | 5̄∨6 | 6∨5̄∨⊥ | Process Synchronize |
| 310 | Decide | Decide | Decide | Decide | Propose |
| 1$^d$ 2 3$^d$ 4 5$^d$ | T | T | ⊥∨6 | 6∨⊥∨⊥ | Process Synchronize |
| | | | 6 | 6 | |
| 312 | SAT | SAT | Propagate | Propagate | Propose |
| 1$^d$ 2 3$^d$ 4 5$^d$ 6̄ 6 | T | T | ⊥ | ⊥ | Process Synchronize |
| 314 | SAT | SAT | Backjump | Backjump | Propose |
| 1$^d$ 2 3$^d$ 4 5̄ | T | T | T | T | Process Synchronize |
| 316 | SAT | SAT | SAT | SAT | Propose |

*Fig. 3*

SATISFIABILITY CHECKING

FIELD

The embodiments discussed herein are related to satisfiability checking.

BACKGROUND

Satisfiability modulo theories (SMT) solving and satisfiability (SAT) solving may allow a computer to reason about systems and computations symbolically. SMT and SAT solving may be used in software verification, symbolic analysis, program verification, automatic testing, security checking, and the like. SAT solving may include determining whether a model of a propositional formula exists such that the formula evaluates as TRUE. SMT solving may include SAT solving in which propositional variables of the SAT problem are replaced with formulas of another mathematical theory.

To perform satisfiability modulo theories (SMT) solving and satisfiability (SAT) solving, some methods and systems may employ the Davis-Putnam-Logemann-Loveland (DPLL) algorithm. The DPLL algorithm is a backtracking-based search algorithm for deciding SAT of propositional logic formulae. Theory solvers may be used with the DPLL algorithm to perform SMT solving. Additional methods and systems have been developed that may improve the performance of the DPLL algorithm. For example, the DPLL may be adapted to employ backjumping, restarting, and/or clause learning.

Efficiency in SMT and SAT solving may remain a significant obstacle, however, particularly when attempting to solve increasingly large problems. For example, in nondeterministic polynomial time (NP)-complete problems, the complexity of the problems may be exponential to the number of variables in the problems. Thus, some SMT and SAT problems may not be solvable using current methods and systems.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a system may include a single instruction, multiple data (SIMD) machine configured to execute multiple threads in parallel. The multiple threads may be divided among multiple blocks. The SIMD machine may be further configured to perform satisfiability checking of a formula including multiple parts. The satisfiability checking may include assigning one or more of the parts to one or more threads of the multiple threads of a first block of the multiple blocks. The satisfiability checking may further include processing the assigned one or more parts in the first block such that first results are calculated based on a first proposition. The satisfiability checking may further include synchronizing the results among the one or more threads of the first block.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 3 illustrates an example of parallelized SAT checking of an example formula that may be implemented in the computer environment of FIG. 1.

DESCRIPTION OF EMBODIMENTS

In some embodiments, a single instruction, multiple data (SIMD) machine may perform satisfiability checking of a formula. The SIMD machine may be configured to execute multiple threads in parallel to perform the satisfiability checking of the formula. The SIMD machine may be further configured such that the multiple threads may be divided among multiple blocks.

The formula may be made up of multiple parts. As part of the satisfiability checking, each part of the formula may be assigned to a thread within a block of the SIMD machine. The SIMD machine may execute the threads assigned the parts of the formula according to a proposition to calculate results. The calculated results may then be synchronized among the threads of the block.

Embodiments of the present invention will be explained with reference to the accompanying drawings.

Figure 1:
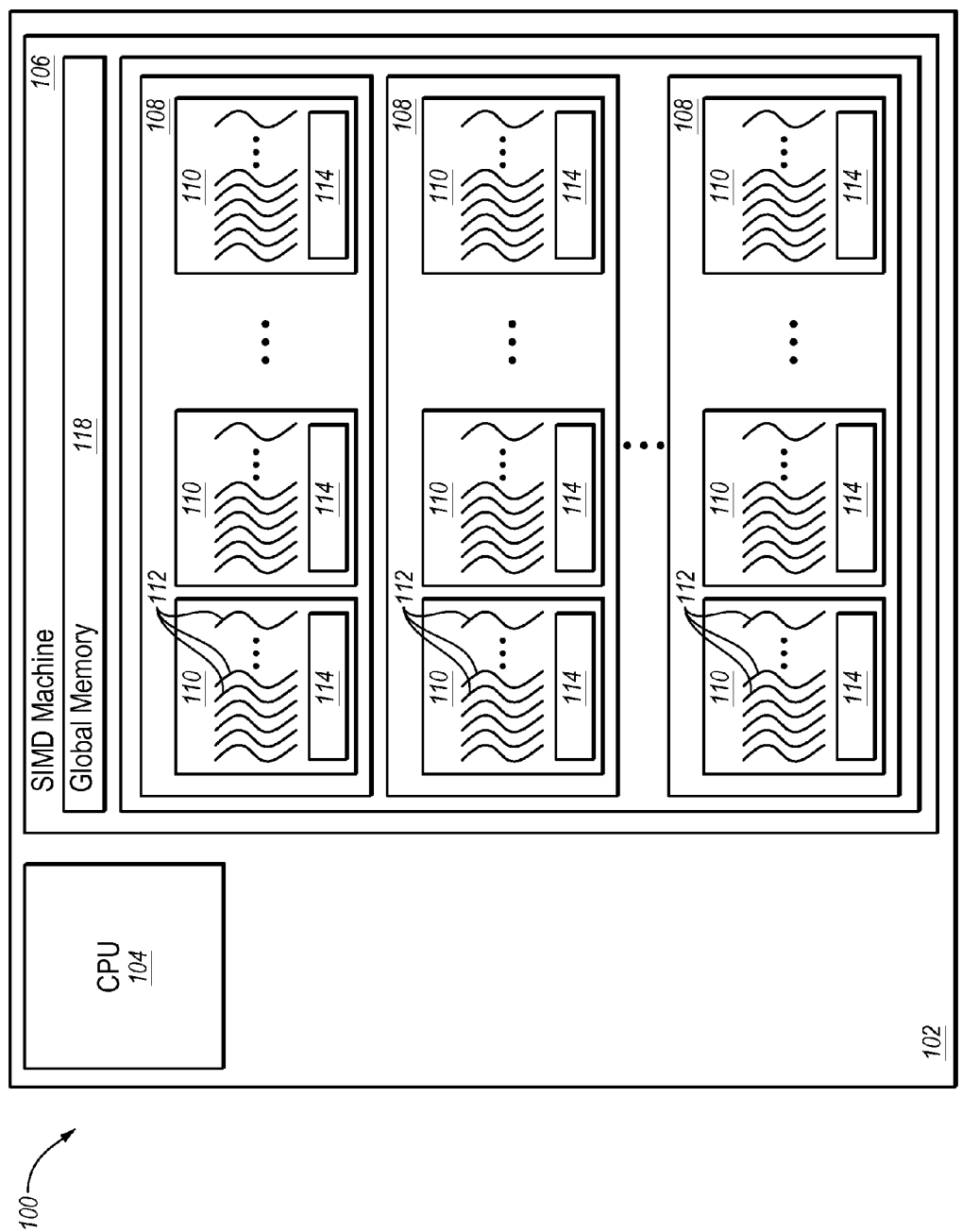
FIG. 1 is a block diagram of an example computing environment.

FIG. 1 is a block diagram of an example computing environment 100, arranged in accordance with at least some embodiments described herein. As illustrated, the computing environment 100 includes a computing entity 102. The computing entity 102 may include a special purpose or general-purpose computer including various computer hardware or software modules, as discussed in greater detail below. As an example, the computing entity 102 may be a mobile phone, smart phone, personal computer, tablet, hand held electronic device, game console, and/or other embedded system.

The computing entity 102 may include a central processing unit (CPU) 104 and a single instruction, multiple data (SIMD) machine 106. The SIMD machine 106 may include multiple processing elements that perform the same or similar operations on multiple sets of data in parallel. For example, the SIMD machine 106 may be a graphics processing unit (GPU) that may be used in the computing entity 102 to accelerate the building of images intended for output to a display coupled to or part of the computing entity 102. In these and other embodiments, the SIMD machine 106 may often remain largely idle when heavy graphics processing is not required.

The SIMD machine 106 may include multiple grids 108. Each grid may include multiple blocks 110. Each block 110 may include multiple threads 112. A grid 108 of blocks 110 may be instructed by a kernel (not illustrated) and/or some other portion of the computing entity 102 to run an algorithm. The threads 112 of a given block 110 may run the same algorithm simultaneously on different parts of a set of data. Multiple blocks 110 of the threads 112 may run simultaneously. Generally, the threads 112 within one block 110 may cooperate with other threads within the same block 110 via shared memory 114. The shared memory 114 may be located on-chip with the processing elements of the SIMD machine 106. In some embodiments, the threads 112 within the different blocks 110 may cooperate via global memory 118. The global memory 118 may be located off-chip and/or on the SIMD machine 106. For example, the global memory 118 may be located off-chip and in dynamic random-access memory (DRAM) (not illustrated) on the SIMD machine 106. In some embodiments, the CPU 104 may access the global memory 118.

In some embodiments, a kernel or other part of the computing entity 102 may provide the SIMD machine 106 with a formula and instructions for SAT and/or SMT checking. Different parts of the formula may be assigned to different threads 112 of the SIMD machine 106. The SIMD machine 106 may then execute the threads 112 assigned the parts of the formula to perform the SAT and/or SMT checking.

Embodiments described herein may be implemented using computer readable media for carrying or having computer executable instructions or data structures stored thereon. Such computer readable media may be any available media that may be accessed by the computing entity 102. By way of example, and not limitation, such computer readable media may include tangible computer readable storage media including random-access memory (RAM), read-only memory (ROM), electrically erasable programmable read-only memory (EEPROM), compact disc read-only memory (CD-ROM) or other optical disk storage, magnetic disk storage or other magnetic storage devices, or any other storage medium which may be used to carry or store desired program code in the form of computer executable instructions or data structures and which may be accessed by the computing entity 102. Combinations of the above may also be included within the scope of computer readable media.

Computer executable instructions may include, for example, instructions and data that cause the computing entity 102, including the CPU 104, the SIMD machine 106, or other processing device to perform a certain function or group of functions.

The systems and methods described herein may be implemented in software, hardware, or a combination of software and hardware. In this description, the computing entity 102 may be any computing system as defined herein, or any module or combination of modulates running on a computing system.

Figure 2:
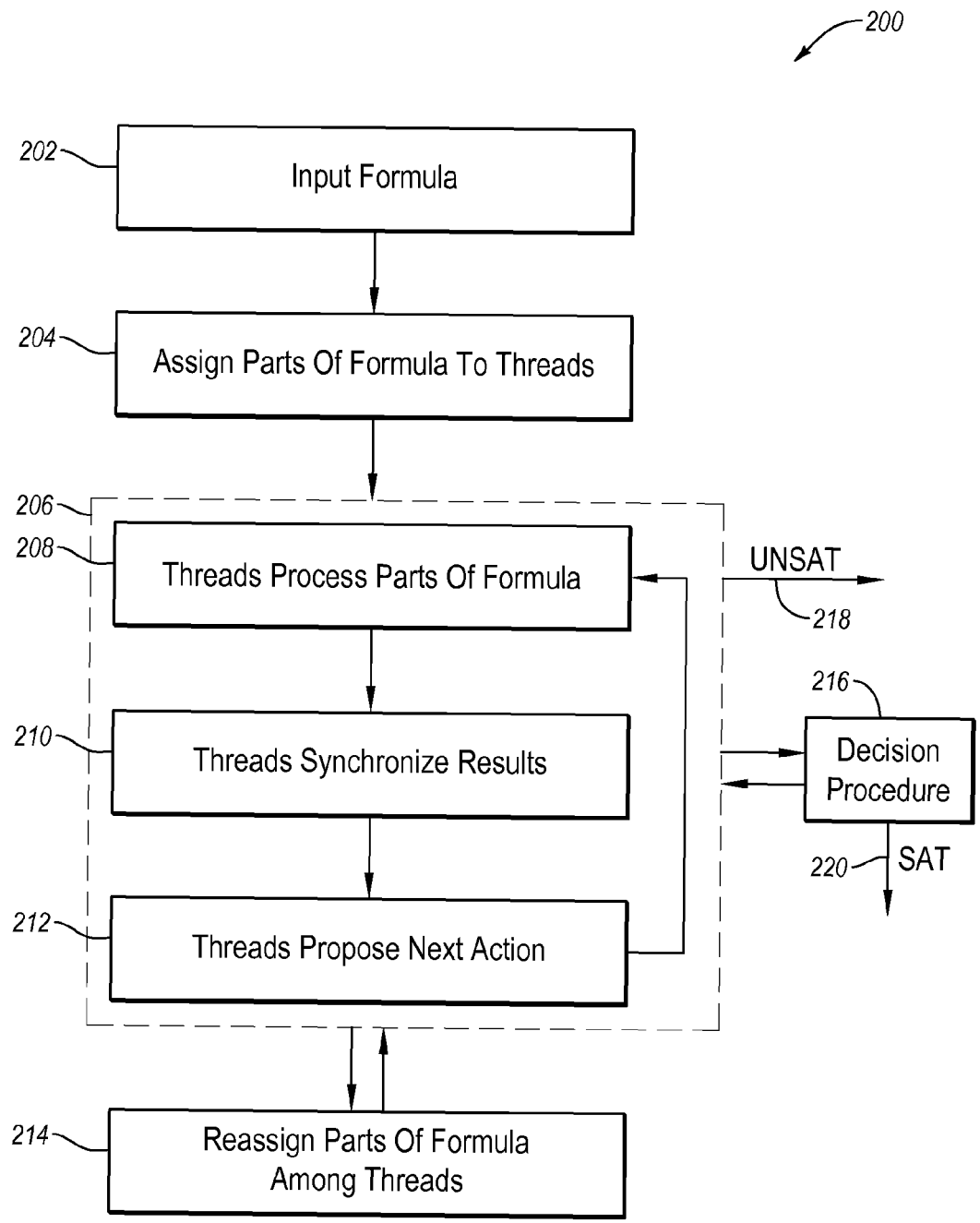
FIG. 2 is a flowchart of an example method of performing parallelized SAT and SMT checking that may be implemented in the computer environment of FIG. 1.

FIG. 2 illustrates a flowchart of an example method 200 of performing parallelized SAT and SMT checking, arranged in accordance with at least some embodiments described herein. The method 200 may be performed by the SIMD machine 106 of FIG. 1. In some embodiments, portions of the method 200 may be performed and/or facilitated by a CPU generally corresponding to the CPU 104 of FIG. 1. Although illustrated as discrete blocks, various blocks may be divided into additional blocks, combined into fewer blocks, or eliminated, depending on the desired implementation.

The method may begin at block 202, with the input of a formula. The formula may be defined by predicates and operators. The formula may also be sectioned into multiple parts. The parts may be sub-formulae of the formula that may combine in a known way to reproduce the formula or its equivalent. The parts may be made up of one or more variables and/or operators. Variables and their negations may be described herein as literals. For example, if A is a variable and $\neg A$ is its negation, A and $\neg A$ may each be described as a literal. The disjunction of literals may be described herein as predicate. A predicate is true if any of its literals is true; and it is satisfiable if there exists an assignment to the variables such that the predicate is true. The conjunction of predicates may be described herein as formulas. Hence a formula is in a CNF (Conjunctive Normal Form) format.

As an illustration, an example formula may be defined as $(\neg 1 \lor 2) \lor (\neg 3 \lor 4) \lor (\neg 5 \lor \neg 6) \lor (6 \lor \neg 5 \lor \neg 2)$. Variables of the formula may be defined as 1, 2, 3, 4, 5, and 6 (or more specifically, the variables may be defined as $v_1$, $v_2$, $v_3$, $v_4$, $v_5$, and $v_6$). Literals of the formula may be defined as $\neg 1$, 2, $\neg 3$, 4, $\neg 5$, $\neg 6$, 6, and $\neg 2$. Parts of the formula may be defined as $\neg 1 \lor 2$, $\neg 3 \lor 4$, $\neg 5 \lor 6$, and $6 \lor \neg 5 \lor \neg 2$, each of which is a predicate. Predicate $\neg 1 \lor 2$ is true if variable 1 has the false value or variable 2 has the true value. The example formula is the conjunction of four predicates; it is true if all its four predicates are true.

At block 204, the parts of the formula may be assigned to threads. The threads may generally correspond to the threads 112 of FIG. 1. In some embodiments, the parts may be assigned to threads included within an individual block. In some embodiments, the parts may be assigned to threads included within multiple blocks. The blocks may generally correspond to the blocks 110 of FIG. 1. In some embodiments, individual parts may be distributed to individual threads. Alternately or additionally, groups of parts may be distributed to individual threads. For example, a group of two or more parts may be distributed to an individual thread.

At block 206, a parallelized DPLL algorithm may be performed. As part of the parallelized DPLL algorithm, a proposition may be formed. The proposition may include one or more literals that may potentially be part of a model that satisfies the formula. If the proposition contains a particular set of literals that satisfies the formula, the particular set of literals may be described as a model of the formula. The proposition may be altered regularly as the parallelized DPLL algorithm 206 is ongoing. For example, through inclusion and removal of literals. The parallelized DPLL algorithm 206 may attempt to alter the proposition in an attempt to form a model that satisfies the formula. If any proposition may be altered into a model of the formula, the formula may be satisfiable (SAT). If no proposition may be altered into a model of the formula, the formula may be unsatisfiable (UNSAT).

Literals included in the proposition may be designated as derived and/or decided literals. Derived literals may be logically derived based on processing the formula according to the proposition. Decided literals may be presumed as part of the DPLL algorithm. For example, literals may be presumed when no literals may be logically derived based on a current state of the proposition. Whether a literal is decided or derived may be remembered. The inclusion of some literals in the proposition may depend on the literals previously included in the proposition. The order in which the literals are added to the proposition may be remembered. A proposition may also include an empty set. For example, the proposition may include an empty set when parts of the formula are first assigned to the threads.

At block 208, the threads may process the parts distributed to them. Generally, the threads may process the parts simultaneously. In this and other embodiments, processing the parts may be based on the proposition. Processing the parts of the formula at block 208 may include evaluating the parts as TRUE or FALSE based on the proposition. Processing the parts may also include deriving a literal based on the proposition. For example, a thread may be assigned a part $A \vee B$. The proposition may include $\neg A$. The thread may logically determine that the literal B should also be included in the proposition, i.e., if the proposition includes $\neg A$, the part $A \vee B$ may only be satisfied by including the necessary literal to make B TRUE. In this example, the literal B may be added to the proposition as a derived literal.

At block 210, the threads may synchronize and exchange the results of the processing in block 208. For example, the threads may exchange derived literals. In some embodiments, the proposition may be updated to include the derived literals. The threads may synchronize and exchange results via a shared memory generally corresponding to the shared memory 114 of FIG. 1. Alternately or additionally, the threads may synchronize and exchange results via a global memory generally corresponding to the global memory 118 of FIG. 1. For example, threads of different blocks may synchronize and exchange results via the global memory. In some embodiments, the synchronization and/or exchange of results may be implemented using built-in SIMD Machine primitives.

At block 212, the threads may propose a next action. Generally, the threads may propose a next action according to a scheme. The scheme may include a set of rules and/or parameters for performing the DPLL algorithm 206. How the method 200 proceeds from the block 212 may depend on the next actions proposed by the threads. In some embodiments, each of the threads may propose different next actions. Alternately or additionally, sets of the threads may propose the same next action while different sets of threads propose a different next action.

In some embodiments where threads propose different next actions, the proposed next actions may be considered according to a hierarchy. For example, a particular next action may be performed by the method 200 if one of the threads proposes it, while another particular next action may be performed only if all of the threads propose it. Some examples of next actions that may be proposed by the threads will now be described.

In some embodiments, the threads may propose deciding as a next action. Deciding may include adding a chosen literal to the proposition. A thread may propose deciding as a next action if the thread was unable to derive a literal, or evaluate its assigned part as TRUE or FALSE based on a current proposition. When proposing deciding as a next action, the thread may propose that a chosen literal be included in the proposition, in place of the un-derived literal, as a decided literal. In some embodiments, if multiple threads propose different chosen literals the threads may vote on which of the chosen literals from the multiple threads to choose as the decided literal in the proposition. Voting may be implemented by built-in SIMD Machine primitives or some other process. After the voting, the one or more elected chosen literals may be added to the proposition as decided literals.

In some embodiments, after a literal is determined, the threads perform unit propagation. The value of the literal is propagated to all predicates. During this process, one or more derived literals that were not included in the proposition the last time the parts may be calculated. Literal derivation and unit proposition may be performed alternatively. For example, after unit propagation a thread may derive a literal based on a current proposition. The thread may also communicate with other threads so that the threads may process their assigned parts based on an updated proposition including the newly derived literal. Multiple threads may propose multiple derived literals. In some embodiments, the other threads may process their assigned parts of the formula based on an updated proposition including each of the multiple derived literals.

As an illustration, consider an example formula $(\neg 1 \vee 2) \vee (\neg 1 \vee 4) \vee (\neg 2 \vee \neg 4 \vee 3) \vee (\neg 1 \vee \neg 2 \vee \neg 3)$. Each of the four predicates of the example formula may be processed by a separate one of four threads, thread 0, thread 1, thread 2, and thread 3. The four threads may decide literal 1 by deciding variable 1 as true through voting. After voting, each thread may propagate literal 1 to its predicate. For example, the thread 0 processing $(\neg 1 \vee 2)$ infers that variable 2 is true since variable 1 is true. Hence it derives literal 2 and notifies the other three threads on this new derived literal. Similarly, thread 1 derives literal 4 through unit propagation. Threads 2 and 3 use the decided and derived literals to simplify their predicates to 3 and $\neg 3$ respectively.

In some embodiments, the threads may propose backjumping as a next action. Backjumping may be proposed by a thread when the thread evaluates its assigned part as FALSE based on a proposition that includes one or more decided literals. Backjumping may include returning the proposition to its state when one of the decided literals was added to the proposition in an attempt to eliminate and/or change a literal that caused the assigned part to be FALSE. For example, literals added to the proposition after the decided literal may be removed from the proposition. Backjumping may also include replacing the decided literal with its negation as a derived literal. In some embodiments, threads proposing backjumping may also propose how far back to jump. If more than one thread proposes jumping back and the proposed amounts differ, the threads may vote on how far back to jump. In some embodiments, if one thread proposes backjumping, threads proposing deciding, and/or satisfying may be ignored.

As an illustration, consider the above example formula $(\neg 1 \vee 2) \vee (\neg 1 \vee 4) \vee (\neg 2 \vee \neg 4 \vee 3) \vee (\neg 1 \vee \neg 2 \vee \neg 3)$. If the threads 0-3 discussed above decide variable 1 to be true through voting, the threads 2 and 3 may derive 3 and $\neg 3$ respectively, which may cause a contradiction. When a contradiction occurs, the threads may propose backjumping to the previous decision and use the negation of the value of the variable decided in the previous decision to proceed. That is, the threads may decide variable 1 to be false, which may make the formula satisfiable.

In some embodiments, the threads may propose failing as a next action. Failing may indicate that the formula may not be SAT. Failing may be proposed by a thread when the thread evaluates its assigned part as FALSE based on a proposition that includes no decided literals (i.e. no further backjumping is possible). In some embodiments, if one thread proposes failing, all other thread proposals may be ignored. If a thread proposes failing, the method 200 may report that the input formula is UNSAT 218.

In some embodiments, the threads may propose satisfying as a next action. Satisfying may be proposed by a thread when the thread evaluates its assigned part as TRUE according to the current proposition. For example, a thread may be assigned the part $A \vee B$. If the proposition includes the literal A and/or the literal B, the thread may propose satisfying. If all of the threads propose satisfying, the formula may be SAT and the method 200 may proceed to a decision procedure 216. If fewer than all of the threads propose satisfying, the threads proposing satisfying may be ignored.

In addition to proposing the actions described herein, the threads may propose other actions that may be used in determining the SAT or UNSAT of a formula, other actions used by DPLL solvers, or other actions to utilize the software or hardware of a computer environment.

A next action may be chosen based on the next actions proposed by the threads. If all of the threads propose satisfying, the method may perform a decision procedure 216 as a next action. If any thread proposes failing, the method 200 may report that the formula is UNSAT 218. If the next action includes additional processing of the parts of the formula by the threads, the DPLL algorithm 206 may return to block 208 and continue the DPLL algorithm 206.

The decision procedure 216 may replace the literals of the proposition with formulae of one or more other mathematical theories and determine if the proposition is SAT under the one or more other mathematical theories. For example, as part of SMT solving. In some embodiments, the decision procedure 216 may be parallelized using the threads. For example, in a manner similar to the DPLL algorithm 206. Alternately or additionally, the decision procedure 216 may use built-in libraries and/or procedures. For example, the decision procedure 216 may use a SIMD Machine library for solving linear expressions via a Simplex method. If the decision procedure 216 determines the proposition is SAT, the method 200 may report that the input formula is SAT 220 and return the satisfying proposition as a model. If the decision procedure 216 determines the current proposition is UNSAT, the decision procedure may determine and return a known conflict to the parallelized DPLL algorithm 206. For example, the decision procedure 216 may add one or more parts to the formula, which may be assigned to the threads at block 204, and the DPLL algorithm 206 may attempt to determine the satisfiability of the formula including the added parts. If the DPLL algorithm 206 determines the current proposition is UNSAT, the input formula may be identified as UNSAT without considering the decision procedure 216.

In some embodiments, the decision procedure 216 may be parallelized on the SIMD machine. For example, a Fourier-Motzkin variable elimination may determine whether a conjunction of linear constraints over real variables is satisfiable. Similar to the DPLL algorithm, the Fourier-Motzkin algorithm may heuristically choose a variable and then eliminate it by propagating the resulting constraints onto the rest of the system. Propagating the resulting constraints may generate new constraints, which may again be propagated. In an SIMD machine, separate threads may process constraints and synchronize to determine which variable or variables to eliminate.

As an illustration, consider the following set of constraints, $(x_1-x_2 \leq 0) \lor (x_1-x_3 \leq 0) \lor (-x_1+x_2+2x_3 \leq 0) \lor (-x_3 \leq -1)$. Each constraint may be processed by a thread. For example, Thread 0 may process the constraint $x_1-x_2 \leq 0$, Thread 1 may process the constraint $x_1-x_3 \leq 0$, Thread 2 may process the constraint $-x_1+x_2+2x_3 \leq 0$, and Thread 3 may process the constraint $-x_3 \leq -1$. The threads may follow a variable elimination process. During the variable elimination process, the threads may propose to eliminate the variable x1 first. Thread 0 and 1 determine two upper bounds on x1 respectively, namely $x_1 \leq x_2$ and $x_1 \leq x_3$; thread 2 determines a lower bound $x_2+2x_3 \leq x_1$. The threads may exchange the determined bounds amongst themselves. After exchanging the determined bounds, each thread may try to simplify its constraint. For example, thread 2 uses the upper bound $x_1 \leq x_2$ to obtain $2x_3 \leq 0$, and uses the upper bound $x_1 \leq x_3$ to obtain $x_2+x_3 \leq 0$. The new set of constraints may be redistributed among the threads such that $2x_x \leq 0$ is processed by Thread 0, $x_2+x_3 \leq 0$ is processed by Thread 1, and $-x_3 \leq -1$ is processed by Thread 2. The variable elimination process may be repeated to obtain $(2x_x \leq 0) \lor (-x_3 \leq -1)$. The constraints from the variable elimination process may be redistributed among the threads such that $2x_x \leq 0$ is processed by Thread 0 and $-x_3 \leq -1$ is processed by Thread 1. The remaining constraints result in the contradictory relationship $1 \leq 0$. In this example, an SIMD machine performing a parallelized Fourier-Motzkin variable elimination may demonstrate that the constraints $(x_1-x_2 \leq 0) \lor (x_1-x_3 \leq 0) \lor (-x_1+x_2+2x_3 \leq 0) \lor (-x_3 \leq -1)$ are unsatisfiable.

During the DPLL algorithm 206, parts of the formula may be reassigned among the threads at block 214, which may be described as load balancing. Load balancing may include redistributing parts of the formula among the threads to efficiently utilize the processing resources available through the threads. In some embodiments, as the parallelized DPLL is performed, the parts that may not need further evaluation may be removed from the formula. For example, parts of the formula may be removed if the remaining formula is equivalent to the original formula. For example, if a formula contains a part $A \lor B$ and a unit part A, the part $A \lor B$ may be removed. The part $A \lor B$ and/or the unit part A may also be removed if a proposition contains the literal A. Parts may also be removed based on the proposition. The remaining parts may be redistributed such that a processing load is balanced among available threads. In some embodiments, load balancing may occur before the threads process the parts of the formula at block 208.

In some embodiments, a response to the next actions proposed by the threads may depend, at least in part, on a scheme of the DPLL algorithm 206. For example, the scheme may influence which decided literals the threads may propose to include in the proposition, how far back to backjump, whether to use part learning, and the like. In some embodiments, the scheme may also influence whether the method 200 uses restarting and how regularly restarting is used. In some embodiments, restarting may be similar to backjumping, but may be undertaken independent of whether threads evaluate parts of the formula as FALSE.

In some embodiments, removed parts may return to the formula after a backjump. For example, a removed part may return to a formula if a proposition is changed by a backjump such that there is no longer a basis for the part's removal. In some embodiments, load balancing may occur between blocks. Load balancing between the blocks may use the global memory. The load balancing may be implemented using built-in SIMD Machine primitives.

In some embodiments, the method 200 may include assigning parts of the formula to threads of a single block. The single block may employ the DPLL algorithm 206 and/or decision procedures 216 to determine whether the formula is SAT 220 or UNSAT 218. In some embodiments, the method 200 may include assigning parts of the formula to threads of multiple blocks. The multiple blocks may employ the DPLL algorithm 206 and/or decision procedures 216 according to a single scheme to determine whether the formula is SAT 220 or UNSAT 218. The threads of the multiple blocks may communicate via a global memory.

In some embodiments, the method 200 may include SAT and SMT checking according to multiple schemes. Performing SAT and SMT checking according to multiple schemes may be described as a portfolio approach. The ability and/or speed of a DPLL algorithm to determine whether a particular formula is SAT or UNSAT may depend on a particular scheme of the algorithm. Generally, whether a first scheme or a second scheme will more efficiently determine whether a particular formula is SAT or UNSAT may not be known before the formula has been identified as SAT or UNSAT.

In some embodiments, multiple independent instances of the method 200 may be performed by a SIMD machine, with each instance of the method 200 operating according to a different scheme. Each instance of the method 200 may divide the formula into different parts and/or perform different actions based on the scheme selected for that instance of the method 200. Generally, if one of the instances of the method 200 determines whether formula is SAT 220 or UNSAT 218 according to a particular scheme, each other instance of the method may stop evaluating the formula.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 3 illustrates an example of parallelized SAT checking 300 of an example formula that may be implemented in the computer environment of FIG. 1, arranged in accordance with at least some embodiments described herein. The illustrated formula includes four parts: $\neg 1 \lor 2$, $\neg 3 \lor 4$, $\neg 5 \lor \neg 6$, and $6 \lor \neg 5 \lor \neg 2$, with negations illustrated using an overline for clarity. Each of the four parts may be assigned to a different one of threads 1-4. Assigning the parts to the threads may generally correspond to block 204 of FIG. 2. The threads 1-4 may generally correspond to the threads 112 of FIG. 1. The parallelized SAT checking may include multiple steps 302, 304, 306, 308, 310, 312, 314, 316. In some embodiments, each step 302, 304, 306, 308, 310, 312, 314, 316 may include a processing stage, a synchronizing stage and a proposing stage. The processing stage, synchronizing stage, and proposing stage may generally correspond to blocks 208, 210, and 212 of FIG. 2, respectively.

Once assigned their part of the formula, the threads 1-4 may process the parts according to a proposition defined by an empty set in step 302. In the illustrated embodiment, the threads 1-4 fail to derive a literal or evaluate their assigned parts as TRUE or FALSE in the processing stage of step 302. In response, the threads 1-4 may not share a literal in the synchronizing stage and may propose deciding as a next action at the proposing stage. In some embodiments, the threads 1-4 may propose a literal to decide. Proposing a literal to decide may generally correspond to deciding as described with reference to block 212 of FIG. 2. If any of the threads 1-4 propose different literals to decide, the threads 1-4 may vote on how to proceed.

In step 304, the proposition may include the decided literal 1. In the illustrated embodiment, decided literals in the proposition include a superscript "d" to indicate that the literal was decided. As illustrated, derived literals include no such superscript. In the processing stage of step 304, the threads 1-4 may process the parts of the formula according to the inclusion of 1 in the proposition. The thread 1 may derive literal 2 at the processing stage. For example, because the proposition includes 1, the proposition should also include the literal 2 for the formula part $\neg 1 \lor 2$ to evaluate as TRUE.

The thread 1 may perform unit propagation at the proposing stage of step 304 to derive literal 2. The thread 1 may share the literal 2 with the threads 2-4 at the synchronization stage of step 304. The threads 1-4 may process their assigned parts according to an updated proposition, which will include the literal 2. As illustrated, the threads 2-4 may perform unit propagation simultaneously and derive new literals.

In step 306, the threads 1-4 may process the parts of the formula according to the inclusion of the literal 2 in the proposition. The thread 1 may evaluate its part of the formula as TRUE, indicated by the symbol T for clarity. In some embodiments, the thread 1 may be assigned another part of the formula. The thread 1 being assigned another part of the formula may be referred to as part redistribution and may generally corresponding to the part redistribution described with reference to block 214. In some embodiments, the thread 1 may propose satisfying as a next action. Proposing satisfying may generally correspond to proposing satisfying as described with reference to block 212 of FIG. 2. As illustrated, the threads 2-4 may propose deciding as a next action. In this and other embodiments, threads proposing deciding as a next action may overrule threads proposing satisfying as a next action.

In steps 308 and 310, the threads 1-4 may continue to process the parts of the formula and the proposition may be updated in a manner similar to the manner described with reference to steps 302, 304, and 306.

In step 312, the threads may process the parts of the formula according to the proposition including the decided literal 5. The thread 3 may derive the literal $\neg 6$ and the thread 4 may derive the literal 6. The thread 3 may share the literal $\neg 6$ and the thread 4 may share the literal 6 at the synchronization stage.

In step 314, at the processing stage, the thread 3 and the thread 4 may evaluate their parts of the formula as FALSE, indicated by the symbol $\perp$. The thread 3 and the thread 4 may propose backjumping as a next action at the proposing stage. For example, the thread 3 and the thread 4 may propose backjumping in response to evaluating their parts of the formula as FALSE while the proposition contains decided and/or derived literals. Proposing backjumping may generally correspond to proposing backjumping as described with reference to block 212 of FIG. 2. Threads proposing backjumping as a next action may overrule threads proposing satisfying, deciding and/or unit propagating. In some embodiments, threads may propose backjumping when a literal and its negation are both shared in the synchronization stage. For example, one or more of the threads 1-4 may propose backjumping in the proposing stage of step 312 after the literals 6 and $\neg 6$ are both shared in the synchronizing stage of step 312.

In some embodiments, backjumping may include returning the proposition to its state when a decided literal was added to the proposition and replacing the decided literal with its negation as a decided literal. For example, as illustrated in step 316, the proposition may be returned to the proposition as processed in step 312, but with the decided literal 5 replaced with its non-decided negation $\neg 5$. In some embodiments, the parallelized SAT checking 300 may include part learning when backjumping is proposed. In step 316, the threads 1-4 may evaluate the parts of the formula as TRUE and may propose satisfying as the next action. In some embodiments, the parallelized SAT checking 300 may return a message that the example formula is SAT when all threads propose satisfying as the next action. Alternately or additionally, the parallelized SAT checking 300 may return the proposition from step 316 as a model that may satisfy the example formula. Alternatively or additionally, when each thread proposes satisfying as the next action, an SMT decision procedure may be performed. For example, an SMT decision procedure as described with relation to block 220 of FIG. 2 may be performed.

Figure 4:
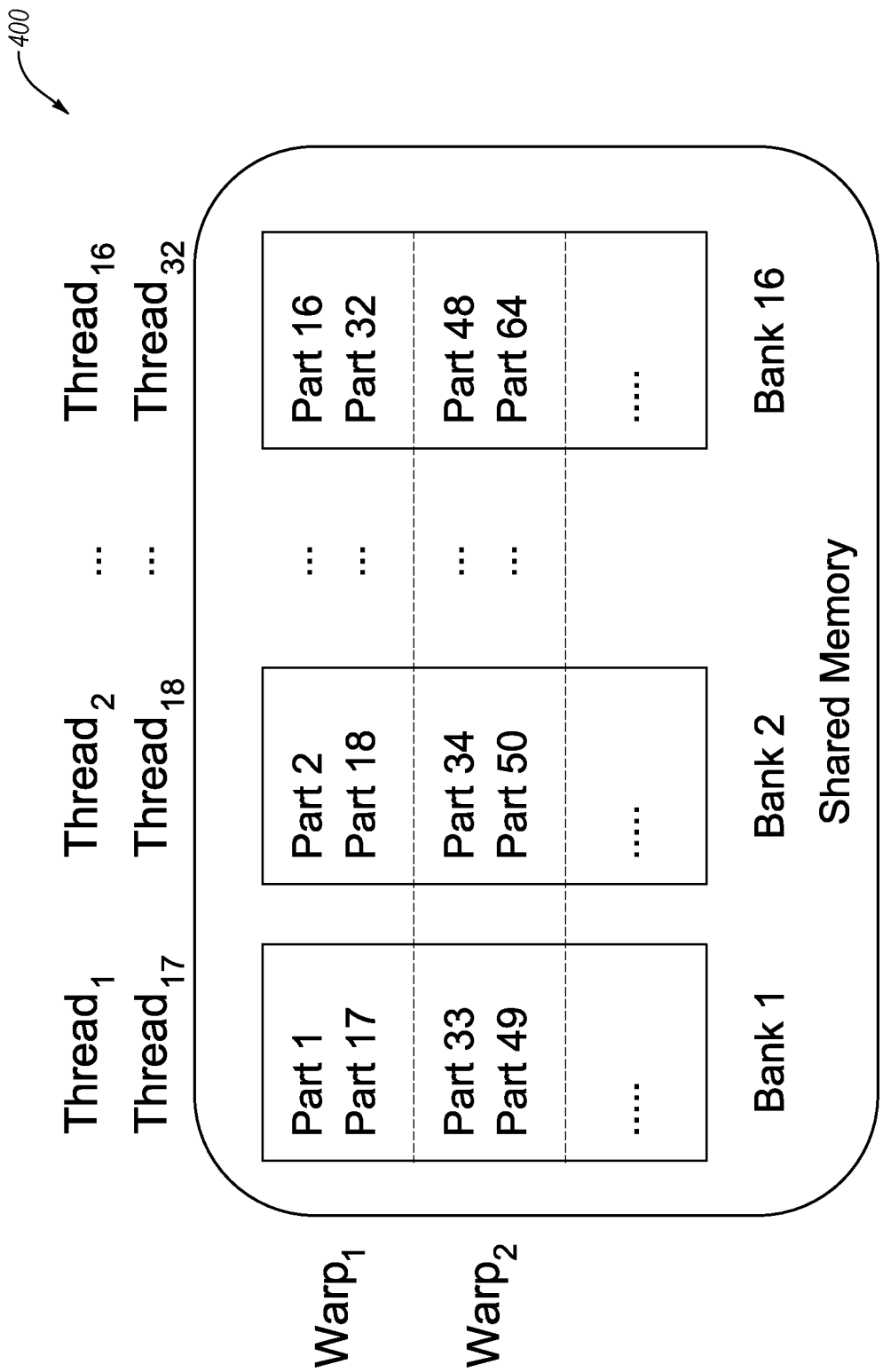
FIG. 4 illustrates an example memory allocation that may be used in the parallelized SAT and/or SMT checking of FIG. 2 and/or FIG. 3.

FIG. 4 illustrates an example memory allocation that may be used in the parallelized SAT and/or SMT checking of FIG. 2 and/or FIG. 3, arranged in accordance with at least some embodiments described herein. In some embodiments, threads 1-32 generally corresponding to the threads 112 of FIG. 1 and may be grouped into warps. In the illustrated embodiment, a warp may contain 32 threads. The threads 1 and 17 of warp 1 may be assigned parts 1 and 17 of a formula, the threads 1 and 17 of warp 2 may be assigned parts 33 and 49, and the like. The threads 1-32 may access different banks in a shared memory. The shard memory may generally correspond to the shared memory 114 of FIG. 1. In some embodiments, when the threads 1-32 access the different banks in the shared memory, memory access performance may be improved. Generally, the performance of the parallelized SAT and/or SMT checking may also be improved. For example, the threads 1 and 17 of the warps 1 and 2 may access bank 1 of the shared memory, the threads 2 and 18 of the warps 1 and 2 may access bank 2 of the shared memory, and so on. Alternately or additionally, more or fewer memory banks may be used. In some embodiments, the threads 1-32 may access memory banks in a global memory generally corresponding to the global memory 118 of FIG. 1.

In order to reduce the synchronization cost, each thread may be pre-allocated a specific memory location, which may be exclusively used by the thread. As an illustration, in block 304, when thread 1 propagates the derived literal 2, it posts this literal into its specific memory without the synchronization with other threads.

In order to reduce the synchronization cost, the threads avoid using synchronizations whenever possible. For instance, in block 304, when thread 1 propagates the derived literal 2, the other threads read this literal through hardware-supported atomic operations which occur simultaneously without any lock steps. When multiple threads read and write the same memory locations, they may use atomic operations to avoid synchronization.

Although the subject matter may be herein described in language specific to structural features and/or methodological acts, it is to be understood that the subject matter defined in the appended claims is not necessarily limited to the specific features or acts described. Rather, the specific features and acts described are disclosed as example forms of implementing the claims.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A system comprising:
a single instruction, multiple data (SIMD) machine configured to:
execute a plurality of threads in parallel, the plurality of threads divided among a plurality of blocks; and
perform satisfiability checking of a formula including a plurality of predicates, the satisfiability checking comprising:
assigning the plurality of predicates to the plurality of threads of the plurality of blocks such that one predicate is assigned to each thread of the plurality of threads;
synchronizing the plurality of threads to execute the same instruction on the plurality of predicates at each stage of a parallelized algorithm; and
performing the parallelized algorithm, including:
at a processing stage, processing the assigned plurality of predicates in the plurality of blocks such that results are calculated based on a proposition;
after each processing of the assigned plurality of predicates, at a synchronizing stage, synchronizing the results among the plurality of threads; and
after each synchronization of the results, at a proposing stage, each of the plurality of threads proposing a next action,
wherein the processing of the assigned plurality of predicates, the synchronizing of the results, and the proposing of the next actions are collectively repeated a plurality of times.

2. The system of claim 1, wherein the SIMD machine comprises a graphics processing unit (GPU).

3. The system of claim 1, wherein performing the parallelized algorithm further includes, after each proposing of the next actions, updating the proposition.

4. The system of claim 1, wherein the next actions proposed by the plurality of threads include at least one of: deciding, satisfying, failing, backjumping, part learning, and restarting.

5. The system of claim 3, wherein the processing of the assigned plurality of predicates, the synchronizing of the results, the proposing of the next actions, and the updating of the proposition are collectively repeated until each of the plurality of threads proposes satisfying as the next action or at least one of the plurality of threads proposes failing as the next action.

6. The system of claim 1, wherein the threads of a first block of the plurality of blocks propose next actions according to a first scheme and the threads of a second block of the plurality of blocks propose next actions according to a second scheme.

7. The system of claim 1, wherein the satisfiability checking further comprises reassigning the plurality of predicates among the plurality of threads.

8. A method of performing satisfiability checking of a formula including predicates in a single instruction, multiple data (SIMD) machine configured to execute a plurality of threads in parallel, the plurality of threads divided among a plurality of blocks, the method comprising:
assigning predicates of a formula to a plurality of threads of a plurality of blocks such that one predicate is assigned to each thread;
synchronizing the plurality of threads to execute the same instructions on the plurality of predicates at each stage of a parallelized algorithm; and
performing the parallelized algorithm, including:
at a processing stage, processing the assigned predicates in the plurality of blocks such that results are calculated based on a proposition;

after each processing of the assigned plurality of predicates, at a synchronizing stage, synchronizing the results among the plurality of threads; and after each synchronization of the results, at a proposing stage, each of the plurality of threads proposing a next action, wherein the processing of the assigned plurality of predicates, the synchronizing of the results, and the proposing of the next actions are collectively repeated a plurality of times.

9. The method of claim 8, wherein the method is performed by a SIMD comprising a graphics processing unit (GPU).

10. The method of claim 8, wherein performing the parallelized algorithm further includes, after each proposing of the next actions, updating the proposition.

11. The method of claim 8, wherein the next actions proposed by the plurality of threads include at least one of: deciding, satisfying, failing, backjumping, part learning, and restarting.

12. The method of claim 10, wherein the processing of the assigned plurality of predicates, the synchronizing of the results, the proposing of the next actions, and the updating of the proposition are collectively repeated until each of the plurality of threads proposes satisfying as the next action or at least one of the plurality of threads proposes failing as the next action.

13. The method of claim 8, wherein the threads of a first block of the plurality of blocks propose next actions according to a first scheme and the threads of a second block of the plurality of blocks propose next actions according to a second scheme.

14. The method of claim 8, further comprising reassigning the plurality of predicates among the plurality of threads.

15. A non-transitory computer readable medium configured to cause a system to perform operations of performing satisfiability checking of a formula including predicates in a single instruction, multiple data (SIMD) machine configured to execute a plurality of threads in parallel, the plurality of threads divided among a plurality of blocks, the operations comprising:

assigning predicates of a formula to a plurality of threads of a plurality of blocks such that one predicate is assigned to each thread of the plurality of threads;

synchronizing the plurality of threads to execute the same instructions each time on the plurality of predicates at each stage of a parallelized algorithm; and performing the parallelized algorithm, including:

at a processing stage, processing the assigned predicates in the plurality of blocks such that results are calculated based on a proposition;

after each processing of the assigned plurality of predicates, at a synchronizing stage, synchronizing the results among the plurality of threads; and after each synchronization of the results, at a proposing stage, each of the plurality of threads proposing a next action, wherein the processing of the assigned plurality of predicates, the synchronizing of the results, and the proposing of the next actions are collectively repeated a plurality of times.

16. The non-transitory computer readable medium of claim 15, wherein the SIMD machine comprises a graphics processing unit (GPU).

17. The non-transitory computer readable medium of claim 15, wherein performing the parallelized algorithm further includes, after each proposing of the next actions, updating the proposition.

18. The non-transitory computer readable medium of claim 15, wherein the next actions proposed by the plurality of threads include at least one of: deciding, satisfying, failing, backjumping, part learning, and restarting.

19. The non-transitory computer readable medium of claim 17, wherein the processing of the assigned plurality of predicates, the synchronizing of the results, the proposing of the next actions, and the updating of the proposition are collectively repeated until each of the plurality of threads proposes satisfying as the next action or at least one of the plurality of threads proposes failing as the next action.

20. The non-transitory computer readable medium of claim 15, wherein the threads of a first block of the plurality of blocks propose next actions according to a first scheme and the threads of a second block of the plurality of blocks propose next actions according to a second scheme.

21. The non-transitory computer readable medium of claim 15, wherein the operations further comprise reassigning the plurality of predicates among the plurality of threads.

* * * * *